US007680450B2

(12) United States Patent
Moscovitz et al.

(10) Patent No.: US 7,680,450 B2
(45) Date of Patent: Mar. 16, 2010

(54) METHOD AND USER EQUIPMENT FOR JAMMING DETECTION AND SIGNALLING IN A MOBILE TELECOMMUNICATIONS NETWORK

(75) Inventors: Yossi Moscovitz, Tel-Aviv (IL); Fabio Deperini, Sgonico (IT); Miran Locatelli, Sgonico (IT)

(73) Assignee: Telit Communications S.p.A., Sgonico (IT)

( * ) Notice: Subject to any disclaimer, the term of this patent is extended or adjusted under 35 U.S.C. 154(b) by 825 days.

(21) Appl. No.: 11/578,339

(22) PCT Filed: May 17, 2005

(86) PCT No.: PCT/EP2005/005343

§ 371 (c)(1),
(2), (4) Date: Oct. 12, 2006

(87) PCT Pub. No.: WO2005/112321

PCT Pub. Date: Nov. 24, 2005

(65) Prior Publication Data

US 2007/0224963 A1    Sep. 27, 2007

(30) Foreign Application Priority Data

May 17, 2004 (IT) ............................. TS2004A0003
May 17, 2004 (IT) ............................. TS2004A0004

(51) Int. Cl.
*H04K 3/00* (2006.01)

(52) U.S. Cl. ............................ 455/1; 455/423; 455/424; 455/425; 455/63.1; 455/63.2; 455/67.11; 455/67.13; 455/501; 455/509

(58) Field of Classification Search ...................... 455/1, 455/423–425, 63.1, 63.2, 67.11, 67.13, 501, 455/509
See application file for complete search history.

(56) References Cited

U.S. PATENT DOCUMENTS

| 5,862,487 | A  | * | 1/1999  | Fujii et al. .................. 455/454 |
| 6,229,998 | B1 | * | 5/2001  | Hamdy et al. ............. 455/226.1 |
| 6,944,422 | B2 | * | 9/2005  | Fitrandolph .................... 455/1 |
| 2003/0235254 | A1 | * | 12/2003 | Fanson et al. ................ 375/260 |
| 2004/0005858 | A1 | * | 1/2004  | Cervinka et al. ................ 455/1 |

\* cited by examiner

*Primary Examiner*—Edward Urban
*Assistant Examiner*—Junpeng Chen
(74) *Attorney, Agent, or Firm*—Scully, Scott, Murphy & Presser, P.C.

(57) ABSTRACT

Method for jamming detection in a mobile telecommunications network comprising the steps of, at a user equipment registered with the mobile telecommunications network: a) measuring a signal power level in at least one of a plurality of communication channels between the user equipment and a base station within a band of operation of the mobile telecommunications network; b) checking whether the signal power level in said at least one communication channel is greater than a threshold MNPL and, if so, attempting to decode a Base Station Identity Code BSIC broadcast by the base station in said communication channel; c) repeating steps a) and b) for a certain number of channels; d) signalling a jammed condition report JDR message to the base station if said BSIC cannot be decoded for said number DCMN of channels.

26 Claims, 3 Drawing Sheets

US 7,680,450 B2

METHOD AND USER EQUIPMENT FOR JAMMING DETECTION AND SIGNALLING IN A MOBILE TELECOMMUNICATIONS NETWORK

TECHNICAL FIELD

The present invention relates to a method and to user equipment for jamming detection and signalling in a mobile telecommunications network.

BACKGROUND ART

A widespread technique for inhibiting operation, in certain areas, of wireless user equipment, such as mobile phones or Bluetooth/Wifi transceivers, is to prevent the user equipment to communicate with the mobile telecommunications network.

Occasionally, inhibition may be required for security reasons, but it may also be used for criminal deactivation of systems that rely on wireless communication for signalling an alarm condition, such as security wireless devices of vehicles for transporting valuables.

In order to prevent any communications, devices called jammers are used, which irradiate high power noise signals over at least one communication channel normally used for wireless transmission of information from the user equipment to the mobile network and vice versa. Typically, jammers transmit in the whole band assigned to the system and, in particular, in the downlink band.

The jamming noise signals drown out the signals transmitted by the base station to the user equipment, so that the user equipment cannot discriminate between the base station signal and the noise. Therefore, the user equipment cannot complete any communication session with the mobile network and cannot even signal its jammed condition to the network or to a security agency.

DISCLOSURE OF THE INVENTION

The aim of the present invention is to allow a user equipment to signal the presence of jammers even when the communications channels are in a jammed state.

Within the above aim, a particular object of the invention is to integrate the jamming detection feature in the user equipment itself, without having to provide external detection apparatuses in the jammed area.

Another object is to increase reliability in communication of a jammed condition and to reduce collision problems.

The above aim and other objects which will become apparent hereinafter are achieved by a method for jamming detection in a mobile telecommunications network comprising the steps of, at a user equipment registered with the mobile telecommunications network:

a) measuring a signal power level in at least one of a plurality of communication channels between the user equipment and a base station within a band of operation of the mobile telecommunications network;

b) checking whether the signal power level in said at least one communication channel is greater than a threshold and, if so, attempting to decode a Base Station Identity Code BSIC broadcast by the base station in said communication channel;

c) repeating steps a) and b) for a certain number of channels;

d) signalling a jammed condition report JDR message to the base station if said BSIC cannot be decoded for said number DCMN of channels.

The above aim and objects are also achieved by a user equipment for detecting and signalling a jammed condition to a service provider in a mobile telecommunications network, comprising: means for measuring a signal power level in at least one of a plurality of communication channels between the user equipment and a base station within a band of operation of the mobile telecommunications network; means for checking whether the signal power level in said at least one communication channel is greater than a threshold MNPL; means for decoding a Base Station Identity Code BSIC broadcast by the base station in said communication channel; means for signalling a jammed condition report JDR message to the base station in response to a failure in said decoding for a certain number DCMN of channels in which the signal power level is greater than the MNPL.

The mobile telecommunications network is preferably selected from the group comprising GSM (Global System for Mobile communications), GSM-DCS (Digital Cellular System), GSM-PCS (Personal Communications System), GPRS (General Packet Radio Service) or EDGE (Enhanced Data Rates for GSM Evolution) networks.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

WAYS TO CARRYING OUT THE INVENTION

Figure 1:
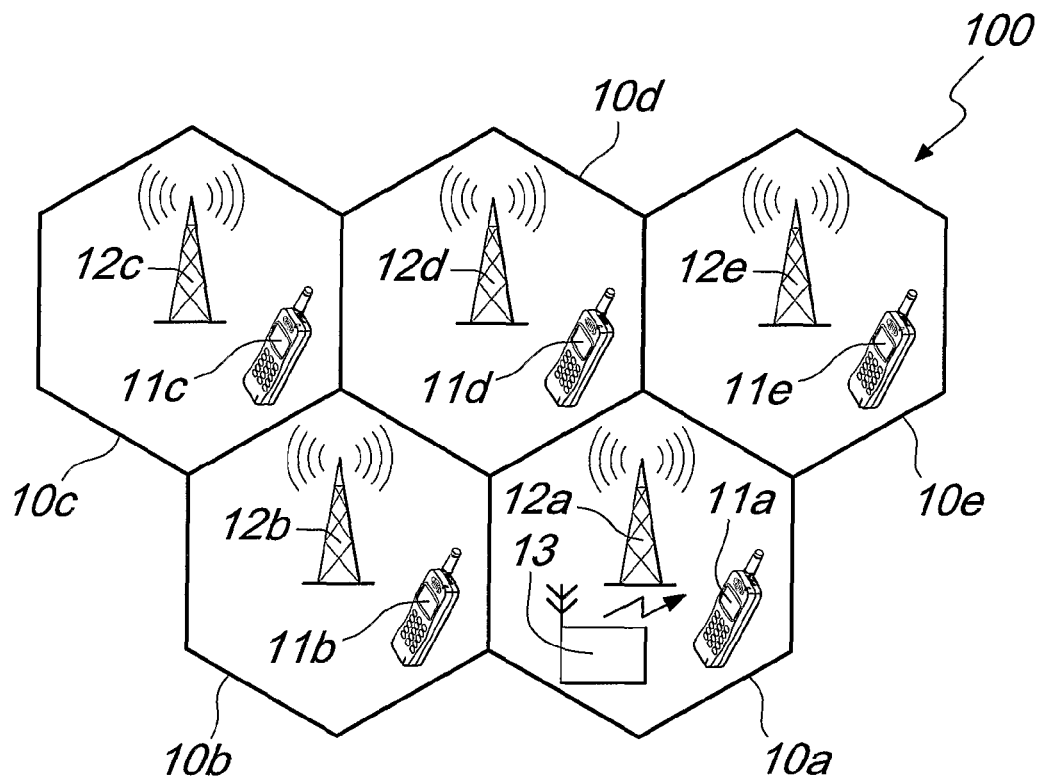
FIG. 1 is schematic cell configuration of a GSM system having a jammer in one cell.

With reference to FIG. 1, a mobile telecommunications network 100 comprises a plurality of coverage areas 10a-10e, usually referred to as "cells", to which respective base stations 12a-12e are associated. The base stations irradiate communication signals within the respective cells and communicate with user equipment or mobile stations 11a-11e that visit the cell, so as to provide access to the telecommunications services of the mobile network.

While the cells are depicted in FIG. 1 as having an identical, hexagonal shape and no overlapping areas, in practice the shape and the size of each cell depends on the radio propagation distance of the base station and the topography of the geographical area where the base station is placed. For this reason, since some areas may be covered by signals irradiated by adjacent cells, the mobile station has to distinguish the signal from the visited cell from the signals irradiated by the base stations of the adjacent cells.

In GSM systems, a Time Division Multiple Access or TDMA scheme is preferably used for information exchange between the mobile stations and the network. In particular, the information is exchanged over a number of carrier frequencies in the form of bursts placed in time slots, grouped in frames which are repeated during transmission.

Each frame is formed by eight time slots that define respective logical channels. Logical channels are divided into traffic channels, which carry payload information, and control channels, which carry control information.

The frames are grouped into multiframes composed of 51 frames. Furthermore, a sequence of 26 multiframes (26*51 frames) defines one superframe, while 2048 times a superframe constitutes a hyperframe.

One of the downlink control channels that is reserved for broadcasting base station information within a cell is the Broadcasting Control Channel (BCCH), which is broadcast at regular intervals by the base station in certain time slots. Base station information is used by the mobile stations to discriminate between a cell to which the mobile station must connect and a neighbouring cell. In particular, a particular code transmitted by the base station and called Base Station Identity Code (BSIC) is used by the mobile station to identify the base station.

Returning to the exemplary configuration of FIG. 1, the cell 10a is affected by a jammer 13, which is irradiating a high power noise signal over one or more communication channels of the base station 12a for a long time period. Such noise signal is sufficiently high to significantly reduce the signal-to-noise ratio to values that prevent a mobile station 11a from exchanging information with the network using the jammed communication channels.

Hereinafter, it is supposed that the mobile station 11a has already been correctly registered with the mobile communication network 100 before encountering jammer 13 or before jammer 13 is activated.

Figure 2:
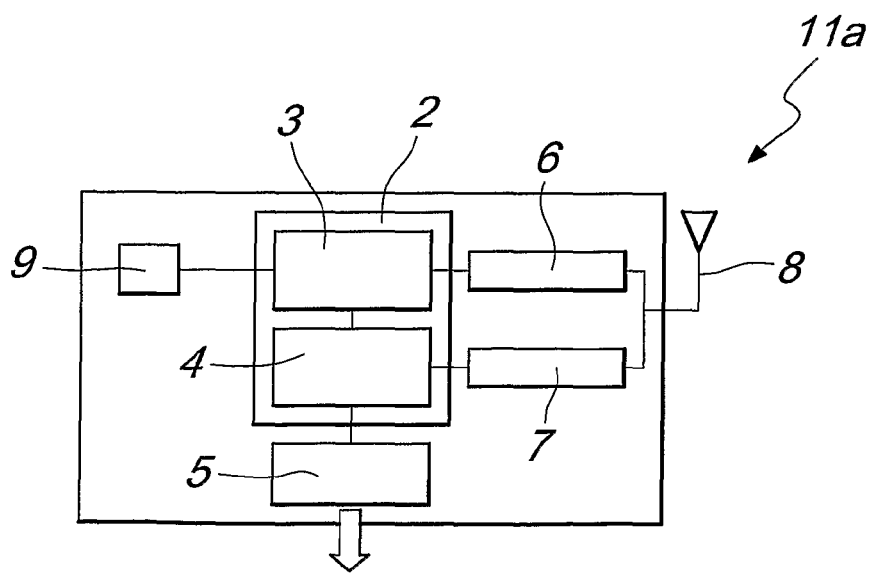
FIG. 2 is a block diagram of a user equipment according to the invention.
Figure 3:
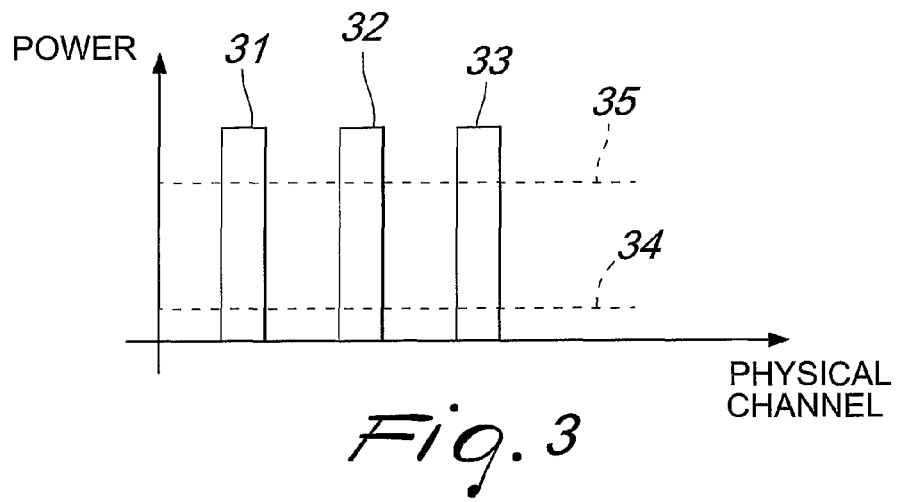
FIG. 3 shows the signal power level versus the logical control channel in the cell of FIG. 1 that is affected by jamming.

With reference to FIGS. 2 and 3, the mobile station 11a according to the invention comprises an antenna 8 which is connected to a jamming sensing and signalling device 2 by means of a receiver 6 and a transmitter 7.

The jamming sensing and signalling device 2 is an electronic circuit comprising a means 3 for measuring signal power in at least one of the communication channels between the user equipment and a base station within at least a band of operation of the mobile network and for checking whether the signal power level in the communication channel is greater than a threshold.

For instance, the means 3 is set so as to detect whether the signal power level 35 in at least one Absolute Radio Frequency Channel (ARFCN) is greater than a threshold representing the highest possible noise power level 34 that can be encountered during normal operation of the mobile communications network, called Maximum Noise Power Level (MNPL).

The MNPL is preferably set in the cell visited by the mobile station, at the discretion of the network operator, and broadcast by the base station in the BCCH.

The user equipment also comprises a decoder 9 for decoding a Base Station Identity Code (BSIC) broadcast by base station 12a and received through the control channels.

The means 3 is also preferably set so as to repeat the above power measurement for a certain number of channels in response to a failure in decoding the BSIC, as it will explained hereinafter.

A signalling device 4 is connected to the output of the means 3 and is also connected to the antenna 8 by means of the transmitter 7. The signalling device 4 is programmed so as to build a jammed condition report (JDR) message to the base station in response to a failure in decoding the BSIC for a predetermined number of channels. The building method of the JDR will be explained hereinafter.

The signalling device 4 is also connected to a local alarm means 5, such as a speaker of the equipment 10a or a local actuator such as, e.g., a car immobilizer, in order to promptly alert the user that the mobile station cannot connect to the network because of a jammer.

While the signalling device 4 and the means 3 for measuring a signal power level and for comparing the signal power level to the MNPL have been shown as separate blocks in FIG. 2, it is clear to the skilled in the art that such means can be implemented through a software modification of existing mobile stations or user equipment, in which the measuring, checking and signalling steps are additionally provided and integrated in the normal procedures for monitoring the network and adjacent communication channels.

The method according to the preferred embodiment of the invention starts from a situation in which the mobile station is already registered with the mobile network 100 before the interfering action of jammer 13 starts.

After the mobile station has been switched on and registered with the mobile network (step 101), a counter of jammed control channels is reset to zero and a first channel is set in the mobile station (step 102). In step 103 the mobile station performs a measurement of a signal power level 35 in the first channel and, in step 104, it checks whether such level is greater than the MNPL. If so, a BSIC decoding procedure is initiated at the mobile station (step 107).

Otherwise, it is optionally checked whether all channels 31-33 have been scanned for determining the respective signal power level (step 105). Such scanning may be performed as a precautionary measure before exiting the jamming detection procedure, so as to determine if any channels which are under attack of a jammer exist.

Therefore, if the signal power level is lower than MNPL and control channels exist which may be searched for determining a jamming state, the mobile station switches to the next channel (step 106) and the procedure jumps to step 103. This optional procedure increases the dependability level of the detected non-jammed status.

Returning to step 107, if no BSIC information can be decoded from the current channel (step 108), i.e. if no signal that is coherently modulated with the system is found, the current channel is marked as being jammed and the counter of jammed channels is increased (step 111).

Then, it is checked whether the number of channels indicated by such counter is greater than a certain number of channels, referred to as DCMN (Disturbed Channels Minimum Number), which number may be predetermined or broadcast by the cell as a system information in the BCCH.

If so, a jamming signalling procedure is activated (step 113), otherwise the mobile station switches to the next channel (step 112) and the procedure jumps to step 103.

In the preferred embodiments of the invention, the DCMN is set to a value greater than zero, e.g. 5, in order to prevent activation of the jamming signalling procedure after having failed a BSIC decoding because, for instance, such decoding was attempted for a frequency carrying only traffic channels.

Returning to step 108, if the BSIC is successfully decoded in the current control channel, the channel can be considered to be in a non-jammed condition and, in step 109, it is optionally checked whether this can be accepted as enough confidence to consider the user equipment not jammed (thus terminating the procedure) or whether it is preferable to scan the remaining channels (step 105) as a precautionary measure.

The jamming signalling procedure initiated in step 113 consists in building a jammed condition report (JDR) message and sending the same to the base station 12a.

Preferably, the JDR message in sent over a known uplink channel called Random Access Channel (RACH). The RACH is defined in 3GPP TS 04.18 version 8.23.0, which is hereby incorporated by reference.

If the mobile telecommunications network is GPRS-based, the JDR message is preferably sent over Packet Random Access Channel PRACH or the EGPRS PRACH. The specification of the PRACH is provided in 3GPP TS 44.060 version 6.12.0 Release 6, which is hereby incorporated by reference.

In order to send the JDR message over the RACH or the PRACH, an Information Field of the Channel Request message as defined in the above ETSI specifications is used. This information field is currently set as being reserved for future use. For instance, it is modified according to the following tables 1-4, which respectively indicate the Channel Request message content on RACH, 11-bit PRACH, 8-bit PRACH and EGPRS PRACH as modified by the current invention. The modified fields are underlined. However, the skilled in the art easily understands that the amendments to the information fields as indicated in the tables below can be carried out differently, as long as the same kind of information is added to the information fields for the same purposes.

TABLE 1

MS Code bits 8 . . . 1

| Code | Description |
|---|---|
| 101xxxxx | Emergency Call |
| 110xxxxx | Call re-establishment; TCH/F was in use, or TCH/H was in use but the network does not set NECI bit to 1 |
| 011010xx | Call re-establishment; TCH/H was in use and the network sets NECI bit to 1 |
| 011011xx | Call re-establishment; TCH/H + TCH/H was in use and the network sets NECI bit to 1 |
| 100xxxxx | Answer to paging |
| 0010xxxx | |
| 0011xxxx | |
| 0001xxxx | |
| 111xxxxx | Originating call and TCH/F is needed, or originating call and the network does not set NECI bit to 1, or procedures that can be completed with a SDCCH and the network does not set NECI bit to 1. |
| 0100xxxx | Originating speech call from dual-rate mobile station when TCH/H is sufficient and supported by the MS for speech calls and the network sets NECI bit to 1 |
| 0101xxxx | Originating data call from dual-rate mobile station when TCH/H is sufficient and supported by the MS for data calls and the network sets NECIbit to 1 |
| 000xxxxx | Location updating and the network does not set NECI bit to 1 |
| 0000xxxx | Location updating and the network sets NECI bit to 1 |
| 0001xxxx | Other procedures which can be completed with an SDCCH and the network sets NECI bit to 1 |
| 011110xx 01111x0x 01111xx0 | One phase packet access with request for single timeslot uplink transmission; one PDCH is needed. |
| 01110xxx | Single block packet access; one block period on a PDCH is needed for two phase packet access or other RR signalling purpose. |
| 01100111 | LMU establishment |
| 01100xx0 | NEW: Jammed condition reporting. xx bytes are the content of the message. |
| 01100x01 | Reserved for future use. |
| 01100011 | Reserved for future use. |
| 01111111 | Reserved for future use. |

TABLE 2

<Packet channel request 11 bit Message content>::=

| | | |
|---|---|---|
| <One Phase Access Request: | 0 | <MultislotClass: bit (5)> |
| | | <Priority: bit (2)> |
| | | <RandomBits: bit (3)>> |
| \|<Short Access Request: | 100 | <NumberOfBlocks: bit (3)> |
| -- The value 100 was allocated in an earlier version of the protocol and shall not be used by the mobile station | | |
| | | <Priority: bit (2)> |
| | | <RandomBits: bit (3)>> |
| \|<Two Phase Access Request: | 110000 | <Priority: bit (2)> |
| | | <RandomBits: bit (3)>> |
| \|<Page Response: | 110001 | <RandomBits: bit (5)>> |
| \|<Cell Update: | 110010 | <RandomBits: bit (5)>> |
| \|<MM Procedure: | 110011 | <RandomBits: bit (5)>> |
| \|<Single Block Without TBF Establishment: | 110100 | <RandomBits: bit (5)>> |
| \|<One Phase Access Request in RLC unack mode: | 110101 | <RandomBits: bit (5)>> |
| \|<Dedicated channel request: | 110110 | <RandomBits: bit (5)>> |
| \|<Emergency call: | 110111 | <RandomBits: bit (5)>> |
| \|<Single block MBMS access: | 111000 | <RandomBits: bit (5)>> |
| \|<JDR reporting: | 111111 | <InformationBits: bit (5)>>; |

TABLE 3

<Packet channel request 8 bit message content>::=

| | | |
|---|---|---|
| <One Phase Access Request: | | <MultislotClass: bit (5)> |
| | | <RandomBits: bit (2)>> |
| \|<Short Access Request: | 00 | <NumberOfBlocks: bit (3)> |
| - The value 00 was allocated in an earlier version of the protocol and shall not be used by the mobile station | | |
| | | <RandomBits: bit (3)>> |
| \|<Two Phase Access Request: | 01000 | <RandomBits: bit (3)>> |
| \|<Page Response: | 01001 | <RandomBits: bit (3)>> |
| \|<Cell Update: | 01010 | <RandomBits: bit (3)>> |
| \|<MM Procedure: | 01011 | <RandomBits: bit (3)>> |
| \|<Single Block Without TBF Establishment: | 01100 | <RandomBits: bit (3)>> |
| \|<One phase Access Request in RLC unack mode: | 011010 | <RandomBits: bit (2)>> |
| \|<Dedicated channel request: | 011011 | <RandomBits: bit (2)>> |
| \|<Emergency call: | 011100 | <RandomBits: bit(2)>> |
| \|<Single block MBMS access: | 01111 | <RandomBits: bit (3)>> |
| <JDR reporting: | 011101 | <InformationBits: bit (2)>>; |

TABLE 4

<EGPRS Packet channel request message content>::=

| | | |
|---|---|---|
| <One Phase Access Request: | 0 | <MultislotClass: bit (5)> |
| | | <Priority: bit (2)> |
| | | <RandomBits: bit (3)>> |
| \|<Short Access Request: | 100 | <NumberOfBlocks: bit (3 |
| -- The value 100 was allocated in an earlier version of the protocol and shall not be used by the mobile station | | |
| | | <Priority: bit (2)> |
| | | <RandomBits: bit (3)>> |
| \|<Two Phase Access Request: | 110000 | <Priority: bit (2)> |
| | | <RandomBit: bit (3)>> |
| \|<Signalling: | 110011 | <RandomBits: bit (5)>> |
| \|<One phase Access Request in RLC unack mode: | 110101 | <RandomBits: bit (5)>> |
| \|<Dedicated Channel Request: | 110110 | <RandomBits: bit (5)>> |

TABLE 4-continued

<EGPRS Packet channel request
message content>::=

| I<Emergency call: | 110111 <RandomBits: bit (5)>> |
| I<Single block MBMS access: | 110001 <RandomBits: bit (5)>> |
| I<JDR reporting: | 111111 <InformationBits: bit (5)>>; |

With reference to the RACH case, the JDR message is represented by bits 01100xx0, where the bits xx are information bits used to identify the user equipment originating the jamming signalling. Similarly, in the PRACH or EGPRS PRACH the information bits can be from 5 to 2, according to the information bit size.

One or more of the above information bits can be used for transmitting an identifier of the user equipment and the remaining information bits can be used for transmitting other information. However, in the preferred embodiment described below, all available information bits (two bits for RACH and 8-bit PRACH, five bits for 11-bit PRACH) are used.

Since the above defined new JDR message can transmit only two (or five) information bits for identifying the user equipment, in order to univocally and precisely identifying the user equipment originating the JDR message the following procedure is performed.

Although the same RACH/PRACH request may be repeated in different time slots having a random distance from one another and for a certain number of times, depending on information sent over the BCCH (according to a procedure that is usual in GSM systems), the user equipment according to the invention is advantageously programmed so as to transmit an ordered sequence of JDR messages in respective RACH/PRACH messages, each JDR message including a predetermined portion of a unique identifier of said user equipment such as a TMSI (Temporary International Mobile Subscriber Identity).

In particular, it is now supposed that a certain number of bits p (greater than 2 or 5, i.e. greater than the information bit size of the JDR message defined in the above tables) is needed for identifying the user equipment, according to predetermined parameters. For instance, 24 bits are necessary for a TMSI and further bits may be required, e.g. CRC bits or GPS-measured position data or location data bits.

The p bits are grouped into two-bit groups (or five-bit groups, in case of an 11-bit message content) and the resulting groups of bits are spread over an ordered sequence of RACH/PRACH JDR messages. In this way, all relevant identification information can be sent using p/2 (or p/5) RACH/PRACH JDR messages.

In order to resolve collisions that may occur on the RACH/PRACH, the p/2 messages are repeated for a certain number of times M. Therefore, the number of JDR messages for identifying the user equipment is equal to M times the bit size of the user equipment identifier (e.g. its TMSI) divided by the number of bits that can be assigned for identifying said user equipment in the RACH/PRACH information field.

Then, the M*p/2 (or M*p/5) JDR messages are sent only at certain frame numbers, i.e. they are not sent on consecutive RACH/PRACH channels. The frame numbers of the RACH/PRACH are preferably chosen among a group of N different sequences of numbers (p/2 or p/5 long) defined by the network cell and orthogonal one to another, for instance out of frame numbers ranging from 0 to 10607 (according to the frame numbering at the Superframe level) that are indicating the RACH/PRACH position in the frame modulo 10608.

Accordingly, the repetitions of the JDR message can be preferably reiterated after one Superframe time, i.e. after 6.2 seconds.

Preferably, the M repetitions of the p/2 (or p/5) JDR messages are performed each time on a randomly chosen sequence of the N different sequences for the particular cell configuration (CCCH or PCCCH), so as to guarantee collision resolution. The different configurations and values for M and N and the RACH/PRACH choice are preferably sent on the BCCH information.

The network operator can reassemble the information contained in the M*p/2 (or M*p/5) JDR messages, identify the user equipment that is jammed and act accordingly.

Figure 5:
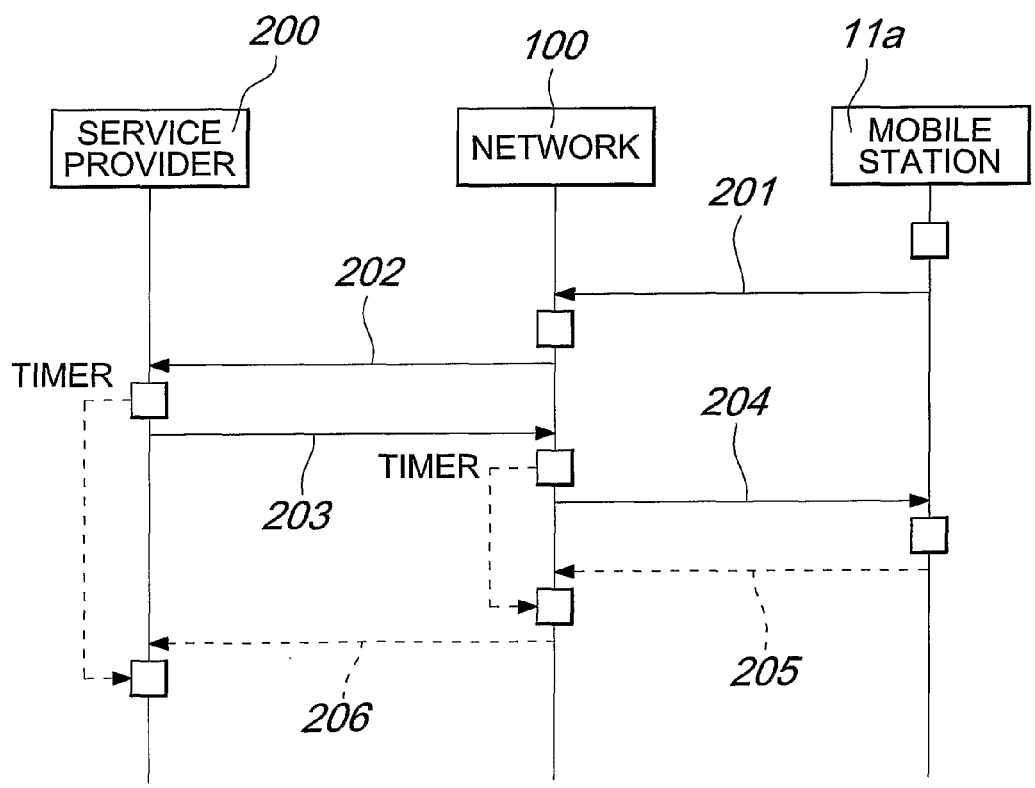
FIG. 5 is a flow chart of the service associated to jamming detection according to the invention.
Figure 4:
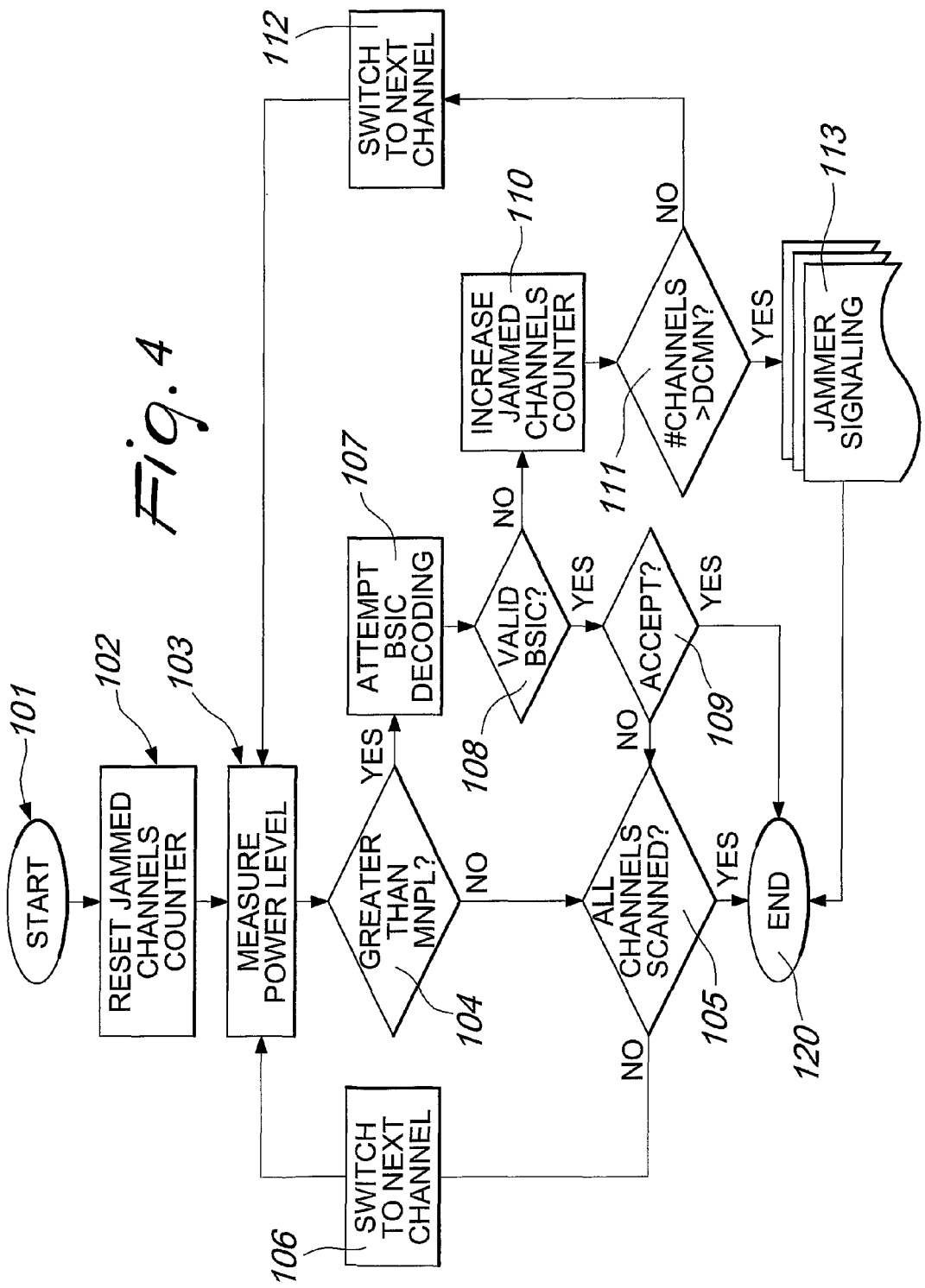
FIG. 4 is a flow chart of a method according to the invention.

In a particular embodiment of the invention, with reference to FIG. 5, a service is associated to the jamming detection and signalling. The service is offered by a Service Provider 200.

As the JDR information is sent to the base station (step 201) and is consequently received by the Service Provider 200 (step 202), appropriate countermeasures can be taken by the Service Provider, e.g. a security agency may be alerted by the Service Provider for intervening at the location of the mobile station that sent the JDR message.

If the information content of JDR messages received by the Service Provider 200 is not complete or cannot immediately enable the Service Provider to take the above countermeasures, the Service Provider preferably initiates a verification request and activates a first timer for setting a first time limit for such verification. The verification request is transmitted to the network operator together with identification data of the mobile station (step 203).

In response to the request, the network operator initiates a paging procedure (step 204) for locating the mobile station and activates a second timer for setting a second time limit that falls earlier than the first one. Other procedures for monitoring the connection status of the mobile station may be provided in alternative embodiments of the invention.

If the mobile station responds to the paging request before the second time limit (step 205), the network sends a confirmation message to the service provider (step 206), otherwise the service provider considers that the mobile station is actually in a jammed condition and activates a countermeasure, for instance alerts an Operational Unit.

The skilled in the art easily understands that the above described steps may be performed by any hardware and/or software and telecommunications means programmed through conventional techniques in order to take into account the additional information and operational data needed by the present invention. A combination of processor, memory and communications means is required in order to measure a signal power level, compare the signal power level to the MNPL and attempt to decode the BSIC.

The invention is therefore preferably implemented by introducing new functionality in existing systems, through conventional techniques which are clearly in the reach of the average technician and, therefore, are not hereby discussed in detail.

It has thus been shown that the present invention fulfils the proposed aim and objects. Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The disclosures in Italian Patent Application No. TS2004A000003 and in Utility Model Application No. TS2004U000004 from which this application claims priority are incorporated herein by reference.

What is claimed is:

1. Method for jamming detection in a mobile telecommunications network comprising the steps of, at a user equipment registered with the mobile telecommunications network:
   a) measuring a signal power level in at least one of a plurality of communication channels between the user equipment and a base station within a band of operation of the mobile telecommunications network;
   b) checking whether the signal power level in said at least one communication channel is greater than a threshold MNPL and, if so, attempting to decode a Base Station Identity Code BSIC broadcast by the base station in said communication channel;
   c) repeating steps a) and b) for a certain number DCMN of channels;
   d) signalling a jammed condition report JDR message to the base station if said BSIC cannot be decoded for said number DCMN of channels.

2. The method of claim 1, wherein the signalling step comprises including said JDR message in a Random Access Channel RACH or in a Packet Random Access Channel PRACH.

3. The method of claim 2, wherein the signalling step comprises including said JDR message in a reserved Information Field of the "Channel Request" message of said RACH or PRACH.

4. The method of claim 1, wherein the JDR message comprises information identifying the user equipment.

5. The method of claim 4, wherein said information identifying the user equipment is a Temporary International Mobile Subscriber Identity TMSI code.

6. The method of claim 4, wherein the signalling step comprises the steps of:
   transmitting an ordered sequence of JDR messages in respective ones of said RACH/PRACH messages, each JDR message including a predetermined portion of said information identifying said user equipment.

7. The method of claim 6, further including the step of repeating said ordered sequence of JDR messages for a predetermined number M of times.

8. The method of claim 6, wherein the JDR messages are sent at predetermined frame numbers.

9. The method of claim 8, wherein the predetermined frame numbers are chosen among a group of N different sequences of numbers indicating the RACH/PRACH position, each of said sequences of numbers being as long as the bit size of said identifying information divided by the number of bits that can be assigned for identifying said user equipment in said reserved RACH/PRACH information field.

10. The method of claim 9, wherein said repeating is performed each time on a randomly chosen one of said N sequences of frame numbers among said group.

11. The method of claim 9, wherein said MNPL, DCMN, M and N are broadcast by the base station.

12. The method of claim 1, further comprising the steps of:
   e) receiving a verification request from the network;
   f) responding to said verification request if the BSIC has been decoded in at least one of said channels.

13. The method of claim 1, further comprising the steps of, at the Service Provider:
   receiving said JDR message;
   verifying the jammed condition according to said JDR message;
   activating a countermeasure for intervening at the location of the jammer causing the jammed condition.

14. User equipment for detecting and signalling a jammed condition to a service provider in a mobile telecommunications network, comprising:
   means for measuring a signal power level in at least one of a plurality of communication channels between the user equipment and a base station within a band of operation of the mobile telecommunications network;
   means for checking whether the signal power level in said at least one communication channel is greater than a threshold MNPL;
   means for decoding a Base Station Identity Code BSIC broadcast by the base station in said communication channel;
   means for signalling a jammed condition report JDR message to the base station in response to a failure in said decoding for a certain number DCMN of channels in which the signal power level is greater than the MNPL.

15. The user equipment of claim 14, wherein the means for signalling is programmed so as to include said JDR message in a Random Access Channel RACH or in a Packet Random Access Channel PRACFJ.

16. The user equipment of claim 15, wherein said JDR message is included in a reserved Information Field of the "Channel Request" message of said RACH or PRACH.

17. The user equipment of claim 14, wherein the JDR message comprises information identifying the user equipment.

18. The user equipment of claim 17, wherein the means for signalling are programmed so as to transmit an ordered sequence of JDR messages in respective ones of said RACH/PRACH messages, each JDR message including a predetermined portion of said information identifying said user equipment.

19. The user equipment of claim 18, wherein said information identifying the user equipment is a Temporary International Mobile Subscriber Identity TMSI code.

20. The user equipment of claim 18, wherein the means for signalling is programmed so as to repeat said ordered sequence of JDR messages for a predetermined number M of times.

21. The user equipment of claim 20, wherein the JDR messages are sent at predetermined frame numbers.

22. The user equipment of claim 21, wherein the predetermined frame numbers are chosen among a group of N different sequences of numbers indicating the RACH position, each of said sequences of numbers being as long as the bit size of said information identifying the user equipment divided by the number of bits that can be assigned for identifying said user equipment in said reserved RACH/PRACH information field.

23. The user equipment of claim 22, wherein said repeating is performed on a randomly chosen one of said sequences of frame numbers among said group.

24. The user equipment of claim 22, wherein said MNPL, DCMN, M and N are broadcast by the base station.

25. The user equipment of claim 14, further comprising means for receiving a verification request from the network, said means for receiving the verification request being set so as to respond to said verification request if the BSIC has been decoded in at least one of said channels.

26. The invention according to claim 14, wherein said JDR message further comprises location information data.

* * * * *